United States Patent
Liao (10) Patent No.: US 7,350,957 B2
(45) Date of Patent: Apr. 1, 2008

(54) LIGHT GUIDE PLATE, SURFACE LIGHT SOURCE HAVING SAME, AND RELATED DISPLAY DEVICE

(75) Inventor: Ming-Yi Liao, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/399,799

(22) Filed: Apr. 7, 2006

(65) Prior Publication Data

US 2006/0233489 A1  Oct. 19, 2006

(30) Foreign Application Priority Data

Apr. 15, 2005 (CN) .................. 200510034243.8

(51) Int. Cl.
*G02B 6/10* (2006.01)
*F21V 7/04* (2006.01)

(52) U.S. Cl. .................. 362/621; 362/615; 385/129

(58) Field of Classification Search .............. 362/606, 362/608, 621, 628, 609, 610, 800, 812, 26, 362/27, 30, 604, 561, 602, 611, 612, 613, 362/622; 349/60, 62, 65, 67, 69; 385/129, 385/130, 131, 132, 146

See application file for complete search history.

(56) References Cited

U.S. PATENT DOCUMENTS

| | | | |
|---|---|---|---|
| 6,086,212 A * | 7/2000 | Onishi et al. | 362/621 |
| 6,893,136 B2 * | 5/2005 | Yang | 362/629 |
| 7,014,343 B2 | 3/2006 | Leu et al. | |
| 7,123,316 B1 * | 10/2006 | Yang et al. | 349/65 |
| 2004/0071437 A1 * | 4/2004 | Tamura et al. | 385/146 |
| 2004/0105248 A1 | 6/2004 | Yu et al. | |
| 2004/0264911 A1 * | 12/2004 | Toeda et al. | 385/146 |
| 2005/0185915 A1 * | 8/2005 | Yu et al. | 385/146 |
| 2006/0078267 A1 * | 4/2006 | Cha et al. | 385/146 |

FOREIGN PATENT DOCUMENTS

CN  1497208 A   5/2004
JP  09061631 A * 3/1997

* cited by examiner

*Primary Examiner*—John Anthony Ward
*Assistant Examiner*—David Crowe
(74) *Attorney, Agent, or Firm*—Jeffrey T. Knapp (57) ABSTRACT

A light guide plate (100) includes a light incident surface (110), two opposite light emitting surfaces (120) each adjoining to the light incident surface, a plurality of first tapered structures (132), and a plurality of second tapered structure (134). The first and second tapered structures are provided on the light incident surface and are tapered in opposite directions. The present LCD lighting system also provides a surface light source (800) and a display device (900) using the light guide plate.

16 Claims, 7 Drawing Sheets

LIGHT GUIDE PLATE, SURFACE LIGHT SOURCE HAVING SAME, AND RELATED DISPLAY DEVICE

CROSS REFERENCE

This application relates to an application of U.S. patent application Ser. No. 10/651,928, filed on Aug. 29, 2003, currently co-pending herewith, the content of which is hereby incorporated by reference thereto.

BACKGROUND

1. Technical Field

The present invention relates to light guide plates and, more particularly, to a light guide plate with tapered structures.

2. Discussion of Related Art

With the great development of electronic devices, the function of a mobile phone has developed from the original one of voice transferring to, now, digital communication together with texts and images. Mobile devices with a fine image, big screen, high definition, and thin profile are greatly desired. Thus, folding-type mobile phones have been popularly used, as they are generally able to fulfill such requisites.

Figure 12:
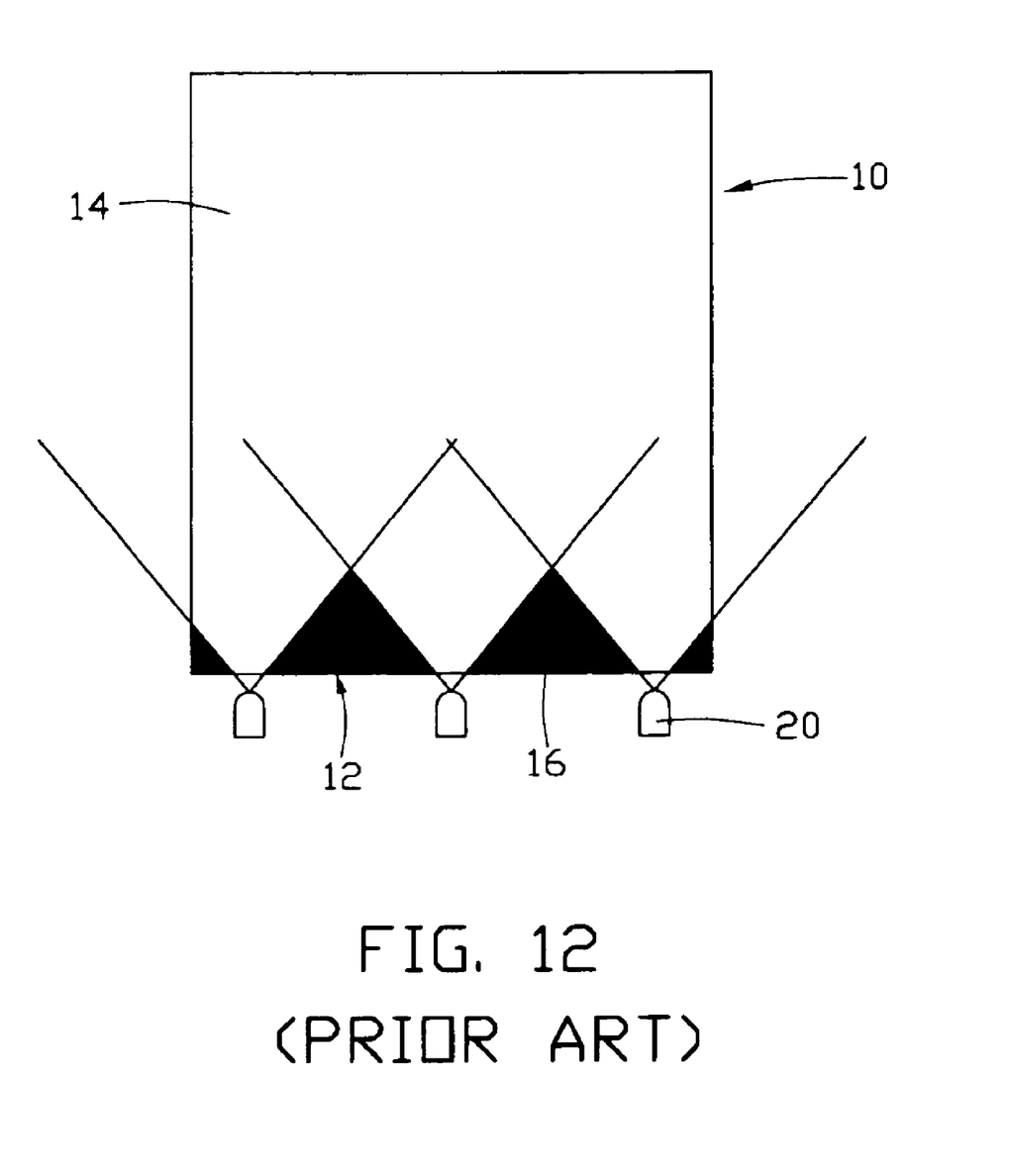
FIG. 12 is a schematic view showing a light transfer direction of a conventional lighting module for folding-type mobile phone.

Referring to FIG. 12, a display of a typical folding type mobile phone includes a light guide plate 10 and a plurality of light sources 20. The light guide plate 10 is a planar type, which includes a light incident surface 12 and two opposite light emitting surfaces 14. The light sources 20 are light emitting diodes (LEDs), which are adjacent the light incident surface 12 and spaced a distance from each other. The display of the mobile phone also has (not shown) a main panel and a sub panel mounted on corresponding light emitting surfaces, respectively. The light guide plate 10 and light sources 20 provide needed backlight to the main panel and the sub panel, simultaneously.

However, when the light sources 20 are in use, a shadow may be formed on the light incident surface 12 of the light guide plate 10, between two light sources 20. Thus, a dark region 16 is produced, which has a potentially detrimental influence on the visual performance.

Therefore, a heretofore-unaddressed need exists in the industry to address the aforementioned deficiencies and inadequacies in lighting uniformity associated with current light guide plates.

SUMMARY

In a preferred embodiment, a light guide plate includes a light incident surface, two opposite light emitting surfaces each adjoining the light incident surface, a plurality of first tapered structures and a plurality of second tapered structures. The first and second tapered structures are provided on the light incident surface and are tapered in opposite directions. Wherein the first and second tapered structures are projections on the light incident surface.

In a second preferred embodiment, a surface light source includes a light guide plate and a plurality of light sources. The light guide plate includes a light incident surface; two opposite light emitting surfaces each adjoining the light incident surface; a plurality of first tapered structures; and a plurality of second tapered structures. The first and second tapered structures are provided on the light incident surface and are tapered in opposite directions (i.e., the first ones are tapered in a first direction; the second ones are tapered in a second, opposite direction). The light sources are disposed adjacent the light incident surface of the light guide plate.

In a third preferred embodiment, a display device includes a light guide plate, which includes a light incident surface, two opposite light emitting surfaces each adjoining the light incident surface, a plurality of first tapered structures, and a plurality of second tapered structures. The first and second tapered structures are provided on the light incident surface and are tapered in opposite directions. The display device also includes a plurality of light sources disposed adjacent the light incident surface, a main panel, and a sub panel. The main panel and the sub panel are mounted adjacent respective light emitting surfaces.

Compared with the conventional foldable mobile phone, the light guide plate provided hereinabove has a plurality of first and second tapered structures on the light incident surface, which can disperse light, received from the light sources, over a wide range. Thus, the potential for dark regions to be formed at the light incident surface between two light sources is substantially reduced or eliminated, and the display effect is greatly improved.

BRIEF DESCRIPTION OF THE DRAWINGS

Many aspects of the dual-face light guide plate, surface light source unit, and display device can be better understood with reference to the following drawings. The components in the drawings are not necessarily to scale, emphasis instead being placed upon clearly illustrating the principles of the present lighting components. Moreover, in the drawings, like reference numerals designate corresponding parts throughout the several views.

DETAILED DESCRIPTION OF THE PREFERRED EMBODIMENT

Figure 1:
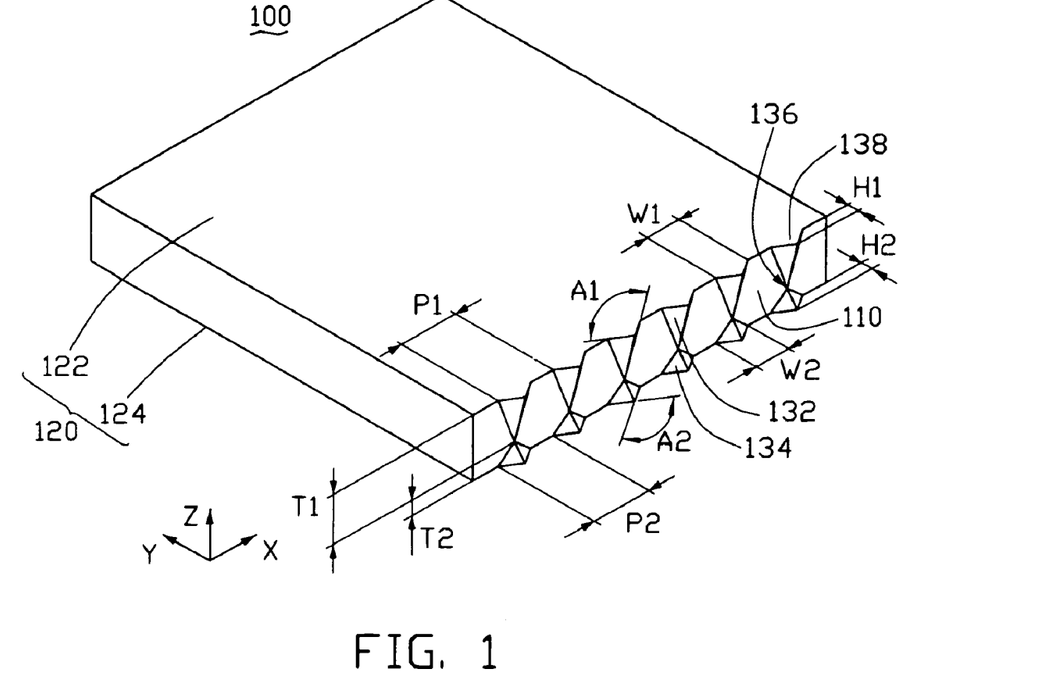
FIG. 1 is a schematic view of a light guide plate of a first preferred embodiment.

Referring to FIG. 1, a light guide plate 100 of the first preferred embodiment includes a light incident surface 110 and two opposite light emitting surfaces 120, each adjoining the light incident surface 110. The two light-emitting surfaces 120 are a first light-emitting surface 122 and a second light-emitting surface 124 opposite to each other. The light incident surface 110 includes a plurality of first tapered structures 132 and a plurality of second tapered structures 134. Each of the first tapered structures 132 and the second tapered structures 134 has a peak 136. The peaks 136 of the first tapered structures 132 and the second tapered structures 134 adjoin with each other, as the first tapered structures 132 are oppositely tapered relative to the second tapered structures 134 and directly opposed thereto. Correspondingly, bottoms or bases 138 of the first tapered structures 132 and the second tapered structures 134 are advantageously coplanar with the first light-emitting surface 122 and the second light-emitting surface 124, respectively, or at least proximate thereto. Wherein the first and second tapered structures are projections on the light incident surface.

Preferably, the light guide plate 100 is a flat transparent or, at least, translucent sheet having a uniform thickness. In the illustrated embodiment, each structure 132, 134 is a pyramidal structure. The pyramidal structure includes a polygonal base/bottom and a plurality of triangular side faces. In the first preferred embodiment, the polygonal bottom is triangular. The first tapered structure 132 and the second tapered structure 134 are formed, e.g., by a three-dimensional or multi-dimensional incising treatment or by another mechanical means.

The first tapered structures 132 each has a triangular bottom having an angle indicated with $A_1$. The second tapered structures 134 each has a triangular bottom having an angle indicated with $A_2$. $W_1$ represents a first width of the triangular bottom of each first tapered structure 132 along the X direction. $W_2$ represents a first width of the triangular bottom of each second tapered structure 134 along the X direction. $H_1$ represents a second width of the first tapered structure 132 relative to the light incident surface 110 along the Y direction. $H_2$ represents a second width of the second tapered structure 134 relative to the light incident surface 110 along the Y direction. $T_1$ represents a height of the first tapered structure 132 on the light incident surface 110 along the Z direction. $T_2$ represents a height of the second tapered structure 134 in the light incident surface 110 along the Z direction. $P_1$ represents a pitch between two adjacent first tapered structures 132 on the first light-emitting surface 122. $P_2$ represents a pitch between two adjacent second tapered structures 134 on the second light-emitting surface 124. The X direction is a horizontal direction of the light incident surface 110; the Z direction is a direction perpendicular to the light emitting surfaces 120. Accordingly, when discussing "the perpendicular direction" in the specification, unless otherwise expressly described, it is this Z direction that is intended.

Different shapes and sizes of the tapered structures 132, 134 can be obtained by adjusting the foregoing parameters. For example, in this embodiment, the first tapered structures 132 have uniform shape, and the second tapered structures 134 also have uniform shape. $P_1$ is not equal to $W_1$, and $P_2$ is not equal to $W_2$. That is, each two adjacent first tapered structure 132 are spaced from each other, as are adjacent second tapered structures 134. Furthermore, $T_1$ is not equal to $T_2$, $H_1$ is not equal to $H_2$, and/or $A_1$ is not equal to $A_2$. That is, the first tapered structures 132 and the second tapered structures 134 are non-symmetrical to each other.

Alternatively, the shape of the first tapered structures 132 could also be non-uniform, and/or the shape of the second tapered structures 134 could also be non-uniform. When the first tapered structures 132 and/or the second tapered structures 134 are arranged spaced from each other in the X direction, the positional relationship of the first tapered structures 132 or the second tapered structures 134 is also considered to be spaced from each other in the X direction.

Figure 2:
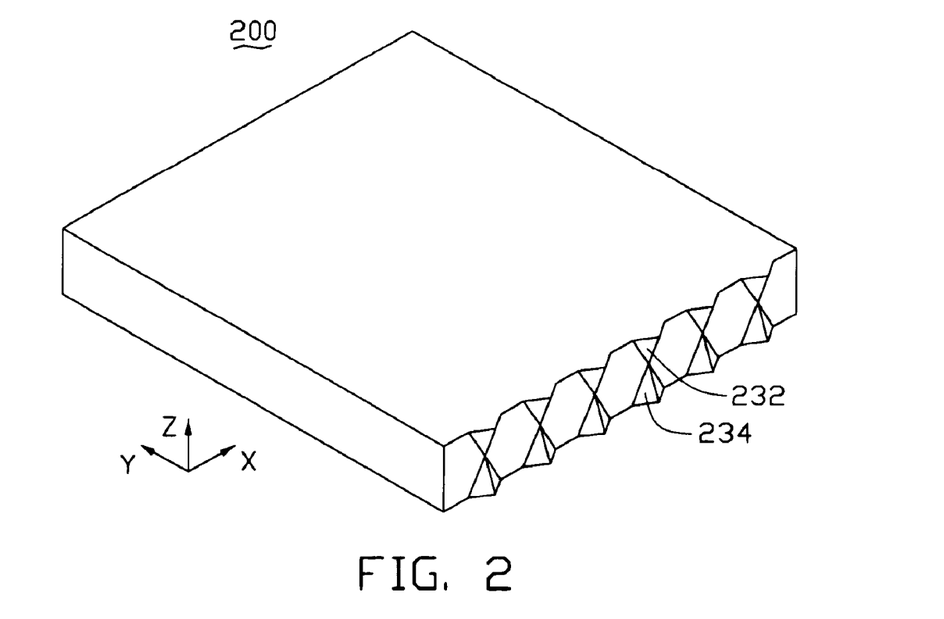
FIG. 2 is a schematic view of a light guide plate of a second preferred embodiment.

FIG. 2 is a schematic view of a light guide plate 200 of a second preferred embodiment. First tapered structures 232 or/and second tapered structures 234 are spaced from each other in the X direction. Compared with that of the first preferred embodiment shown in FIG. 1, the first tapered structures 232 of the light guide plate of the second embodiment and the second tapered structures 234 thereof are symmetrical in the Z direction.

Figure 3:
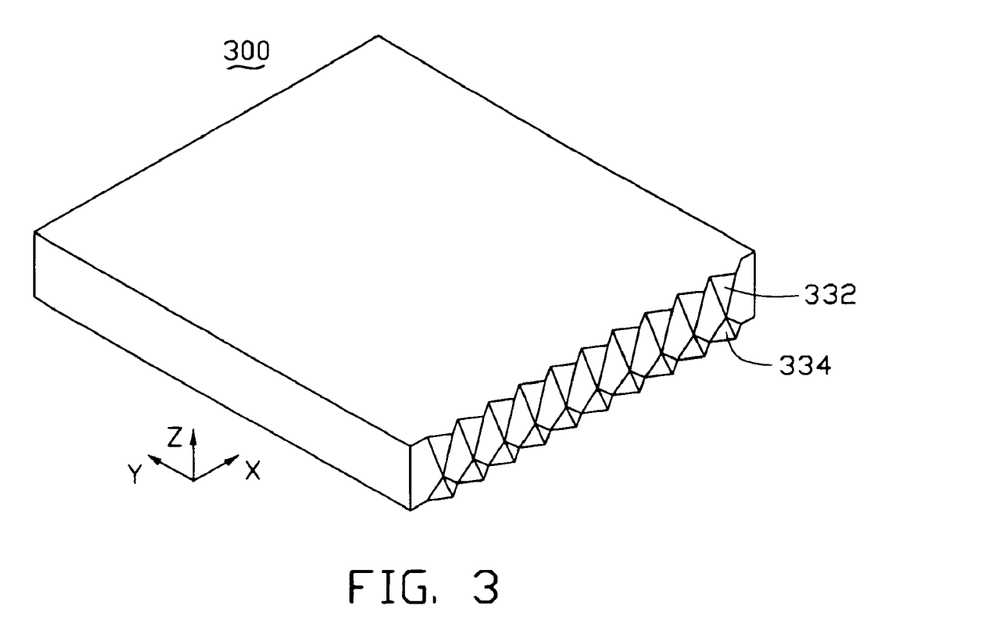
FIG. 3 is a schematic view of a light guide plate of a third preferred embodiment.

Referring to FIG. 3, a schematic view of a light guide plate 300 of a third preferred embodiment is shown. First tapered structures 332 and second tapered structures 334 are non-symmetrical in the Z direction. Compared with that of the first preferred embodiment shown in FIG. 1, the first tapered structures 332, as a group, and/or the second tapered structures 334, as a group, are contiguous in the X direction (i.e., adjacent bases touch). In this embodiment, either or both of the first tapered structures 332 and the second tapered structures 334 could also be configured to be non-uniform in size or shape.

Figure 4:
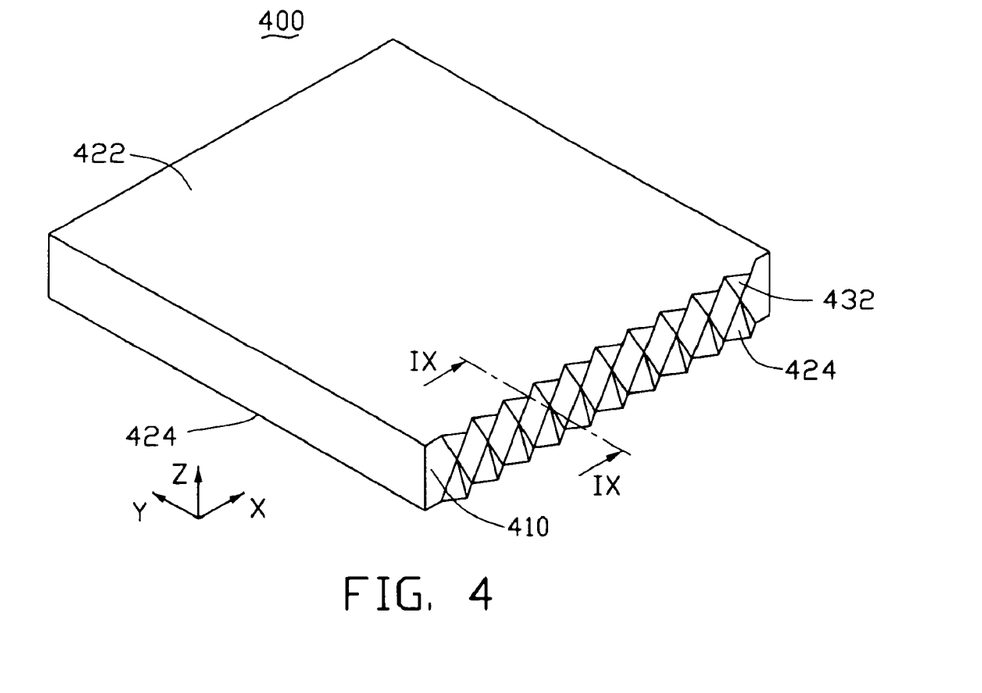
FIG. 4 is a schematic view of a light guide plate of a fourth preferred embodiment.

Referring to FIG. 4, a schematic view of a light guide plate 400 of a fourth preferred embodiment is illustrated. A first light emitting surface 422 and an opposed second light emitting surface 424 each adjoin the light incident surface 410. First tapered structures 432 and second tapered structures 434 are arranged on the light incident surface 410. Compared with that of the first preferred embodiment shown in FIG. 1, the first tapered structures 432 and the corresponding second tapered structures 434 are contiguous in the horizontal direction and symmetrical in the perpendicular direction. Alternatively, the first tapered structures 432 or the second tapered structures 434 could also be configured to be non-uniform in size or shape, as long as they are symmetrical in the perpendicular direction and contiguous in the horizontal direction.

Figure 5:
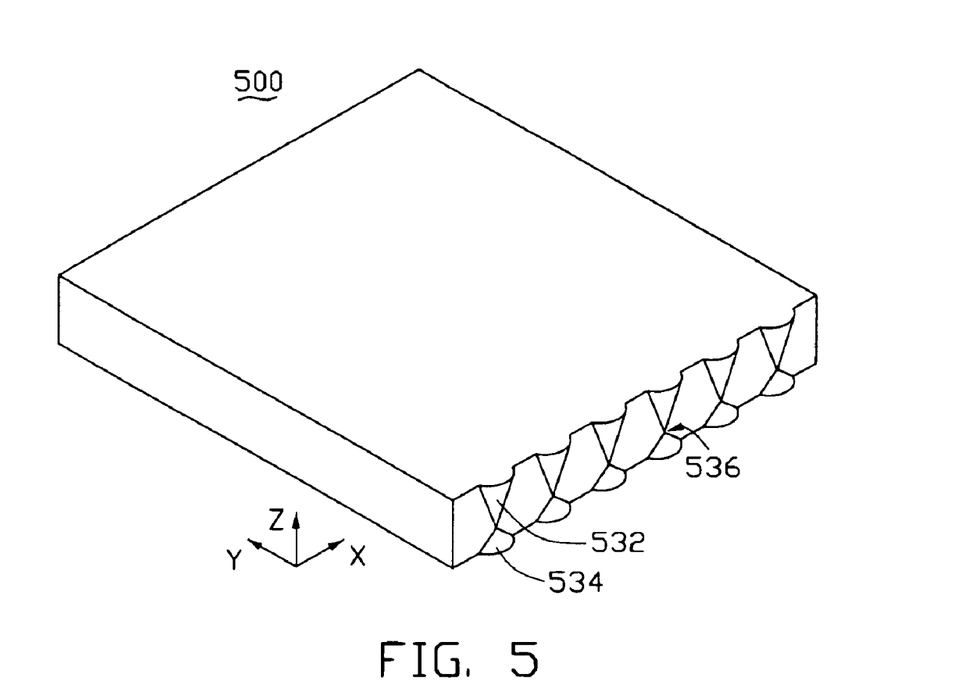
FIG. 5 is a schematic view of a light guide plate of a fifth preferred embodiment.

Referring to FIG. 5, a schematic view of a light guide plate 500 of a fifth embodiment is provided. Compared with that of the first preferred embodiment, both the first tapered structures 532 and the second tapered structures 534 of the fifth embodiment are semi-conical in shape, each having a peak 536. The corresponding peaks 536 of the first tapered structures 532 and the second tapered structures 534 adjoin with each other. In this embodiment, the first tapered structures 532 and/or the second tapered structures 534 are spaced from each other in the horizontal direction. Furthermore, they are non-symmetrical in the perpendicular direction.

A light guide plate of a sixth preferred embodiment (not shown) is similar to that of the second preferred embodiment. However, the first tapered structures and the second tapered structures of the sixth embodiment are semi-conical in shape. They are symmetrical in the perpendicular direction, spaced from each other in the horizontal direction.

A light guide plate of a seventh preferred embodiment (not shown) is similar to that of the third preferred embodiment. However, the first tapered structures and the second tapered structures of the seventh preferred embodiment are semi-conical in shape, yet, like the third embodiment, are contiguous in the horizontal direction and non-symmetrical in the perpendicular direction.

A light guide plate of an eighth preferred embodiment (not illustrated) is similar to that of the fourth preferred embodiment. However, the first tapered structures and second tapered structures of the eighth embodiment are semi-conical in shape. They are contiguous in the horizontal direction and symmetrical in the perpendicular direction.

A light guide plate of the ninth preferred embodiment (not illustrated) includes the similarly-shaped first tapered structures and similarly-shaped second tapered structures. However, shapes of the first tapered structures are different from that of the second tapered structures. That is, if all the first tapered structures are pyramidal, then all the second tapered structures are semi-conical in shape, and vice versa.

A light guide plate of the tenth preferred embodiment (not shown) includes an upper row of first tapered structures and a lower row of second tapered structures. The first tapered structures include at least a pyramidal tapered structure and at least a semi-conical tapered structure. Likewise, the second tapered structures include at least a pyramidal tapered structure and at least a semi-conical tapered structure.

Alternatively, the first tapered structures and the second tapered structures could be spaced from each other in the horizontal direction and/or non-symmetrical in the perpendicular direction. The first tapered structures and the second tapered structures could also be spaced from each other on the horizontal direction and symmetrical on the perpendicular direction. The first tapered structures and the second tapered structures could also be contiguous on the horizontal direction and non-symmetrical along the perpendicular direction. The first tapered structures and the second tapered structures could also be contiguous on the horizontal direction and symmetrical on the perpendicular direction. Essentially, Applicant recognize that the choice of any combination of the various sizes, shapes, and/or placements for the disclosed first and second tapered structures is within the scope of the present light guide plate and the related lighting devices.

Figure 6:
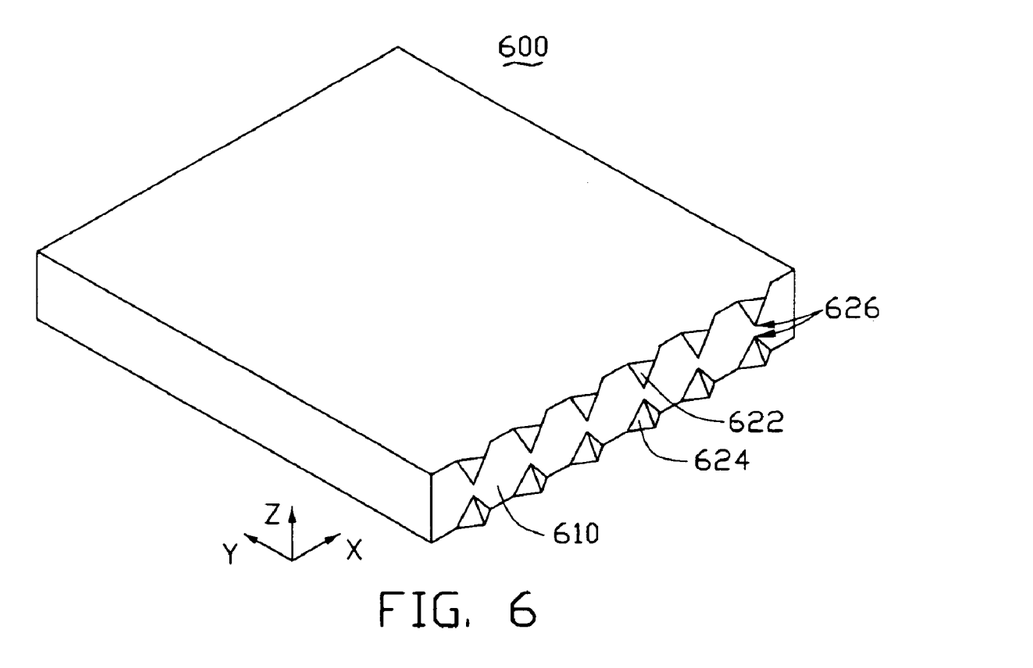
FIG. 6 is a schematic view of a light guide plate of a eleventh preferred embodiment.

Referring to FIG. 6, a light guide plate 600 of an eleventh embodiment includes a light incident surface 610 with a plurality of first tapered structures 622 and a plurality of second tapered structures 624 provided thereon. Each of the first tapered structures 622 and the second tapered structures 624 has a peak 626. The peaks 626 of the first tapered structures 622 and the second tapered structures 624 are spaced apart from each other. The positional relationship of the first tapered structures 622 and the second tapered structures 624 could potentially be arranged according to any of the above-described configurations consistent with the present light guide plate.

Figure 7:
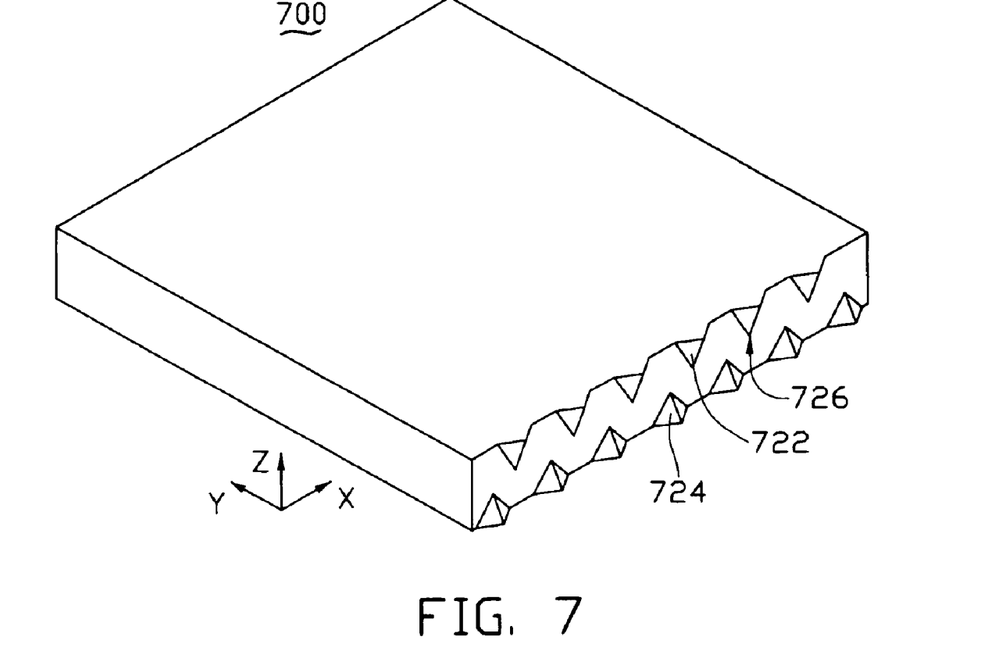
FIG. 7 is a schematic view of a light guide plate of a twelfth preferred embodiment.

Referring to FIG. 7, this illustration shows a light guide plate 700 of a twelfth preferred embodiment. The light guide plate 700 is similar to that of the eleventh preferred embodiment. The first tapered structures 722 and the second tapered structures 724 each have a peak 726. However, the first tapered structures 722 and the second tapered structures 724 are arranged in a staggered fashion. Distances between each two adjacent first and/or second tapered structures 722 can be equal or unequal.

Figure 8:
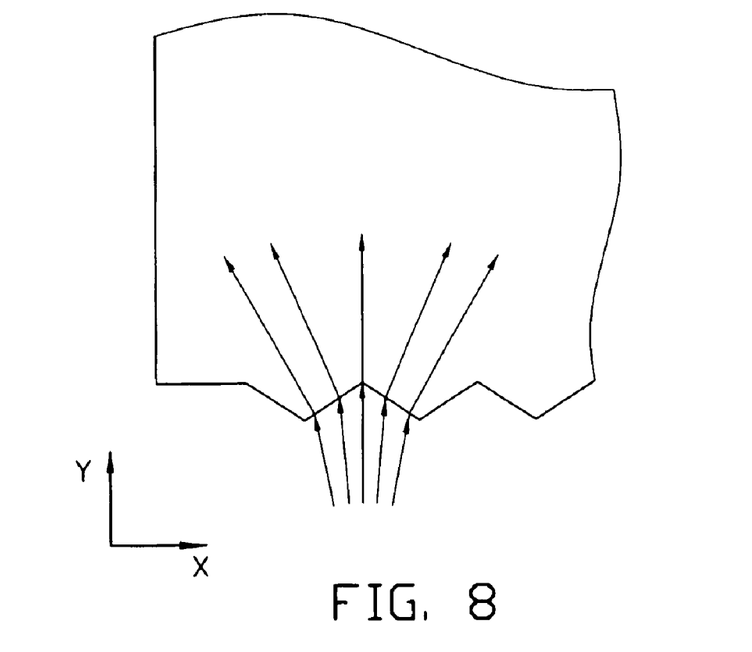
FIG. 8 is a schematic view showing a light transfer direction at the light incident surface from a visual angle parallel to the light incident surface of a present light guide plate.

FIG. 8 shows light paths associated with a version of the present light guide plate. Arrows represent propagation directions of light. Generally, the light guide plate is made of a light-permeable material, for example PMMA. The refractive index of PMMA, denoted as $n_2$, is about 1.5, and that of air, denoted as $n_1$, is about 1.0. According to Snell's law, $n_1 \cdot \sin A_1 = n_2 \cdot \sin A_2$, and, thus, when light enters into a light guide plate from air, the propagation direction of light will vary, ultimately resulting in light scattering, as shown in FIG. 8.

Figure 9:
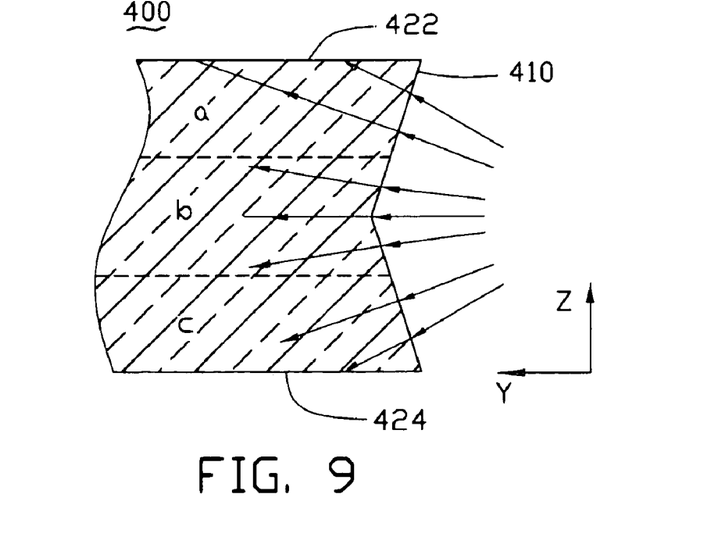
FIG. 9 is a schematic view showing a light transfer direction at a cross section along IX-IX of FIG. 4.

FIG. 9 is a schematic cross-sectional view showing a sampling of light transfer directions, taken along line IX-IX of FIG. 4. The light guide plate 400 is divided into three parts: Part a, Part b and Part c. Incident angles of light entering into Part a and Part c are bigger than incident angles associated with Part b. Thus, light entering Part a and Part c from the light incident surface 410 will emit from the first light emitting surfaces 422 and the second light emitting surfaces 424, separately, at a region near the light incident surface 410. Meanwhile, the light incident at Part b upon the light incident surface 410 has a small incident angle, approximately parallel to the incoming light beam. It will emit from the light emitting surfaces 422, 424 at a region relatively far away from the light incident surface 410. Accordingly, light entering into the light incident surface 410, when considering the net effect of the light incident upon Parts a, b, and c, will emit from the light emitting surfaces 422, 424 with a uniform brightness. The principle of light transference in the light guide plate 400 is applicable to any embodiment hereinabove. When the light guide plate is used in a foldable-type mobile phone, uniform images shown in a main panel and a sub panel of the folding-type mobile phone can be observed.

Figure 10:
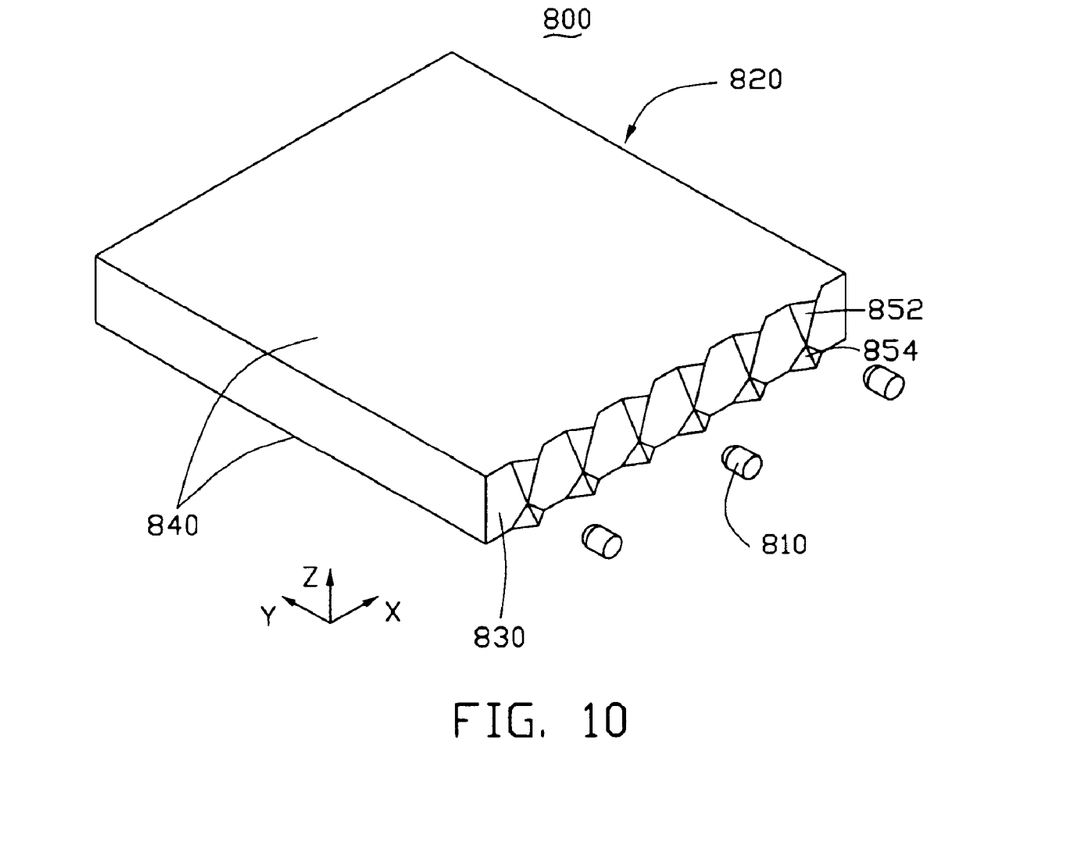
FIG. 10 is a schematic view of a surface light source unit, using the light guide plate provided herein.

Referring to FIG. 10, a surface light source unit 800 includes a plurality of light sources 810 and a light guide plate 820. The light guide plate 820 includes a light incident surface 830 and two light emitting surfaces 840, each adjoining the light incident surface 830. The light guide plate 820 is planar. The light sources 810 are adjacent the light incident surface 830. They are advantageously light emitting diodes (abbreviated as LEDs). The light incident surface 830 includes a plurality of first tapered structures 852 and a plurality of second tapered structures 854. The shapes, sizes, and positions of the first tapered structures 852 and the second tapered structures 854 can be configured to be similar to or identical with any one of the foregoing embodiments.

Figure 11:
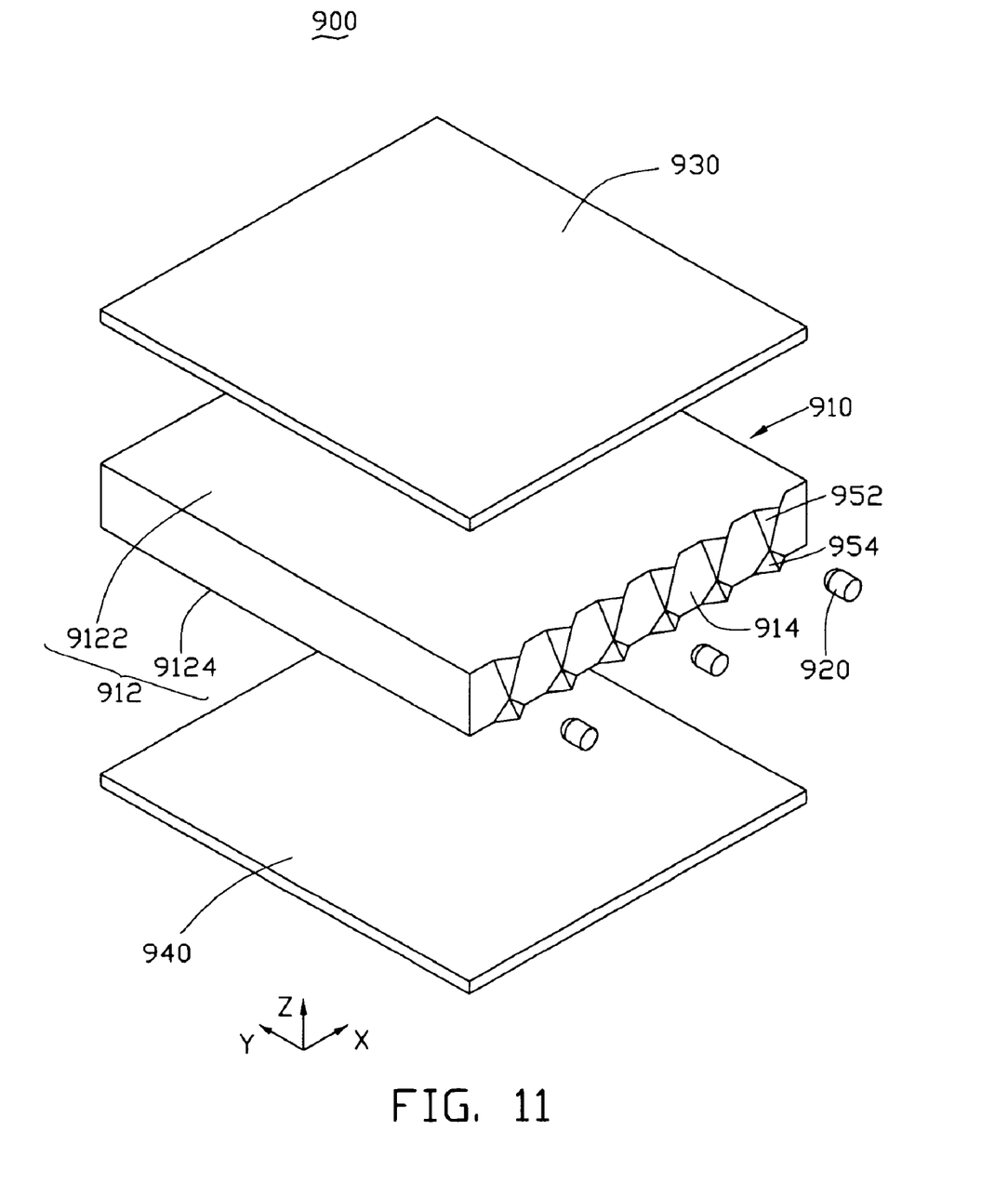
FIG. 11 is a schematic view of a schematic view of a display device, using the light guide plate provided herein.

Referring to FIG. 11, a display device 900 includes a light guide plate 910, a plurality of light sources 920, a main panel 930, and a sub panel 940. The light guide plate 910 includes a light incident surface 914 and two opposite light emitting surfaces 912, each adjoining the light incident surface 914. The light sources 920 are adjacent the light incident surface 914. The main panel 930 and the sub panel 940 are respectively arranged at a side of (i.e., adjacent) a corresponding light emitting surface 912. In this embodiment, the main panel 930 is mounted at the side of the first light emitting surface 9122, while the sub panel 940 is mounted at the side of the second light emitting surface 9124. The light incident surface 914 includes a plurality of first tapered structures 952 and a plurality of second tapered structures 954. The shapes, sizes and positions of the first tapered structures 952 and the second tapered structures 954 can be configured to be similar to or identical with any one of the foregoing embodiments. In use, different embodiment of light guide plate 910 can be used according to the different gap between the sub panel 940 and the light incident surface 914.

Compared with the lighting module of a conventional folding-type mobile phone, the present light guide plate provided hereinabove has a plurality of first tapered structures and a plurality of second tapered structures in opposite directions. By being so arranged, as described above, such a combination of structures can disperse light from light sources over a wide range. Thus, shadow regions, previously formed at the light incident surface between two light sources, is eliminated or at least substantially reduced. Furthermore, it can fit the need of different visual effects between the main panel and the sub panel, thus can greatly improve the display effect. It is further noted that the size, shape, and relative placement of a given tapered structure will impact the dispersing qualities thereof, so each combination of tapered structures can be expected to produce an at least somewhat unique light dispersion pattern. Additionally, it is understood that the present light guide plate could be used in any of a variety of LCD systems, not just those employed in foldable mobile phones.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A light guide plate having a block body, comprising:
  a light incident surface;
  a first light emitting surface and a second light emitting surface, the first and second light emitting surfaces being at opposite sides of the block body, the first and second light emitting surfaces adjoining the light incident surface;
  a plurality of first tapered projections provided on the light incident surface adjacent to the first light emitting surface, wherein a width of each first tapered projection relative to the light incident surface along a direction perpendicular to the light incident surface progressively decreases away from the first light emitting surface; and
  a plurality of second tapered projections provided on the light incident surface adjacent to the second light emitting surface, the second tapered projections being tapered in an opposite direction relative to the first tapered projections wherein a width of each second tapered projection relative to the light incident surface along a direction perpendicular to the light incident surface progressively decreases away from the second light emitting surface.

2. The light guide plate as claimed in claim 1, wherein each first tapered projection adjoins a corresponding second tapered projection.

3. The light guide plate as claimed in claim 1, wherein the first tapered projections are spaced apart from the second tapered projections.

4. The light guide plate as claimed in claim 1, wherein the first tapered projections and the second tapered projections are arranged in a staggered fashion.

5. The light guide plate as claimed in claim 1, wherein at least one of the first tapered projections and the second taped projections is substantially one of pyramidal and semi-conical in shape.

6. The light guide plate as claimed in claim 1, wherein at least one of the first tapered projections and a corresponding second tapered projection are spaced from each other.

7. The light guide plate as claimed in claim 1, wherein at least one of the first tapered projections, as a group, and the second tapered projections, as a group, are contiguous.

8. The light guide plate as claimed in claim 1, wherein at least one of the first tapered projections and the second tapered projections are non-symmetrical.

9. The light guide plate as claimed in claim 8, wherein the first tapered projections and the second tapered projections are non-symmetrical.

10. The light guide plate as claimed in claim 1, wherein at least one of the first tapered projections and the second tapered projections are symmetrical.

11. The light guide plate as claimed in claim 10, wherein the first tapered projections and the second tapered projections are symmetrical.

12. The light guide plate as claimed in claim 1, wherein the block body is a flat sheet having a uniform thickness.

13. The light guide plate as claimed in claim 1, wherein the first tapered projections and the second tapered projections each have a base and a peak, the base of each first tapered projection being at least one of proximate and coplanar with the first light emitting surface, the base of each second tapered projection being at least one of proximate and coplanar with the second light emitting surface.

14. A surface light source comprising:
  a light guide plate comprising:
    a light incident surface;
    a first light emitting surface and a second light emitting surface, the first and second light emitting surfaces being at opposite sides of the light guide plate, the first and second light emitting surfaces adjoining the light incident surface;
    a plurality of first tapered projections provided on the light incident surface adjacent to the first light emitting surface, wherein a width of each first tapered projection relative to the light incident surface along a direction perpendicular to the light incident surface progressively decreases away from the first light emitting surface; and
    a plurality of second tapered projections provided on the light incident surface adjacent to the second light emitting surface, the second tapered projections being tapered in an opposite direction relative to the first tapered projections, wherein a width of each second tapered projection relative to the light incident surface along a direction perpendicular to the light incident surface progressively decreases away from the second light emitting surface; and
  a plurality of light sources disposed adjacent the light incident surface of the light guide plate.

15. The surface light source as claimed in claim 14, wherein the light sources are light emitting diodes.

16. A display device comprising:
  a light guide plate comprising:
    a light incident surface;
    a first light emitting surface and a second light emitting surface, the first and second light emitting surfaces being at opposite sides of the light guide plate, the first and second light emitting surfaces adjoining the light incident surface;
    a plurality of first tapered projections provided on the light incident surface adjacent to the first light emitting surface, wherein a width of each first tapered projection relative to the light incident surface along a direction perpendicular to the light incident surface progressively decreases away from the first light emitting surface; and
  a plurality of second tapered projections provided on the light incident surface adjacent to the second light emitting surface, the second tapered projections being tapered in an opposite direction relative to the first tapered projections, wherein a width of each second tapered projection relative to the light incident surface along a direction perpendicular to the light incident surface progressively decreases away from the second light emitting surface;
  a plurality of light sources adjacent the light incident surface;
  a main panel; and
  a sub panel, the main panel and the sub panel being mounted adjacent respective of the first and second light emitting surfaces.

* * * * *